United States Patent [19]
Graham

[11] 3,895,682
[45] July 22, 1975

[54] MOTOR DRIVEN DOLLY ACTUATOR FOR SEMI-TRAILERS AND SIMILAR VEHICLES

[76] Inventor: Richard G. Graham, 1618 Regent St., Niles, Mich. 49120

[22] Filed: Sept. 26, 1973

[21] Appl. No.: 400,969

[52] U.S. Cl. ............. 180/1 R; 280/150.5; 254/86 R
[51] Int. Cl. ............................................. B60s 9/18
[58] Field of Search .......... 280/150.5; 180/1 R, 1 A, 180/1 AS; 254/86 R

[56] References Cited
UNITED STATES PATENTS

| | | | |
|---|---|---|---|
| 1,359,044 | 11/1920 | Farrington | 254/86 R |
| 1,631,135 | 6/1927 | Judd | 254/86 R |
| 2,002,724 | 5/1935 | Walker | 180/1 A |
| 2,233,135 | 2/1941 | Ketel | 254/86 R |
| 2,372,705 | 4/1945 | Bicker | 280/150.5 |
| 2,523,962 | 9/1950 | Mahaffey et al. | 254/86 R |
| 3,257,098 | 6/1966 | Hotchkin | 254/86 R |

Primary Examiner—Kenneth H. Betts
Assistant Examiner—Jack D. Rubenstein

[57] ABSTRACT

A motor driven dolly actuator for semi-trailers and similar vehicles wherein the dolly is disposed at the front conventional end portion of the semi-trailer and is provided with an air driven motor to effect the telescopic raising and lowering of the dolly between its inoperative raised position away from the ground and its operative extended position supporting the forward end of the trailer, the air driven motor connected to controls located in the vehicle cab to effect the raising and lowering of the wheel without the vehicle operator having to expose himself to the elements of the weather.

1 Claim, 5 Drawing Figures

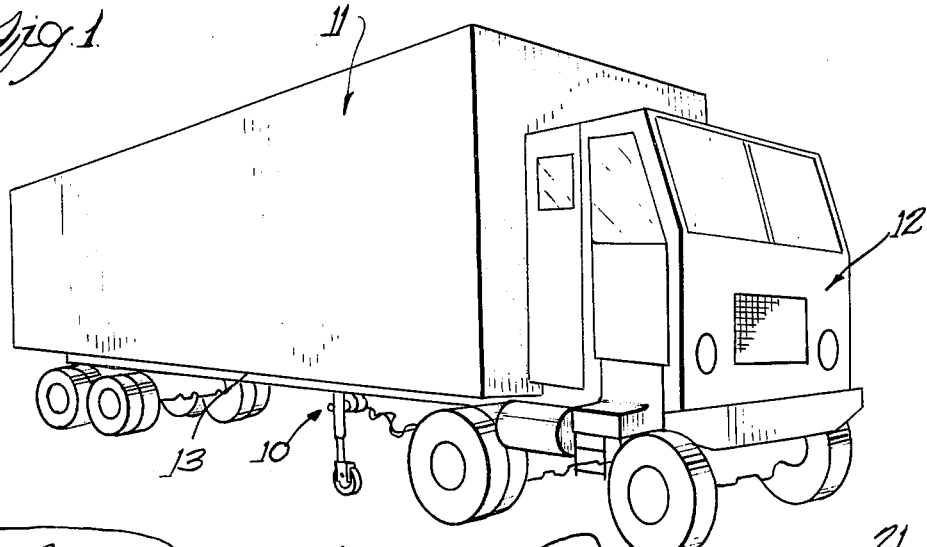
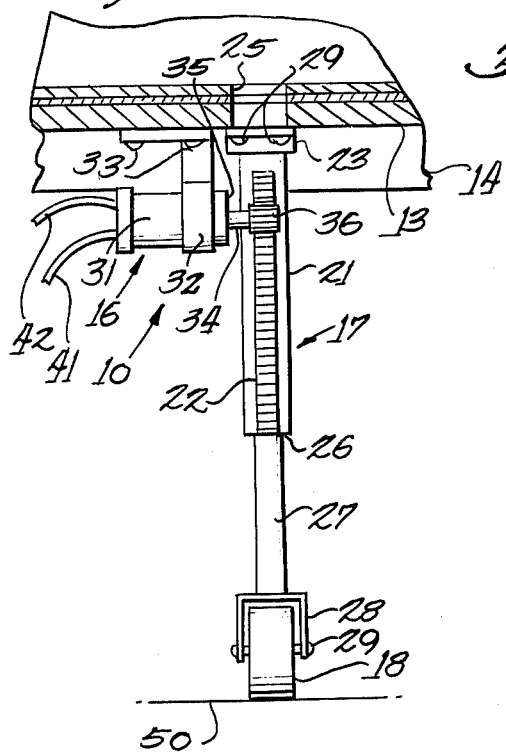
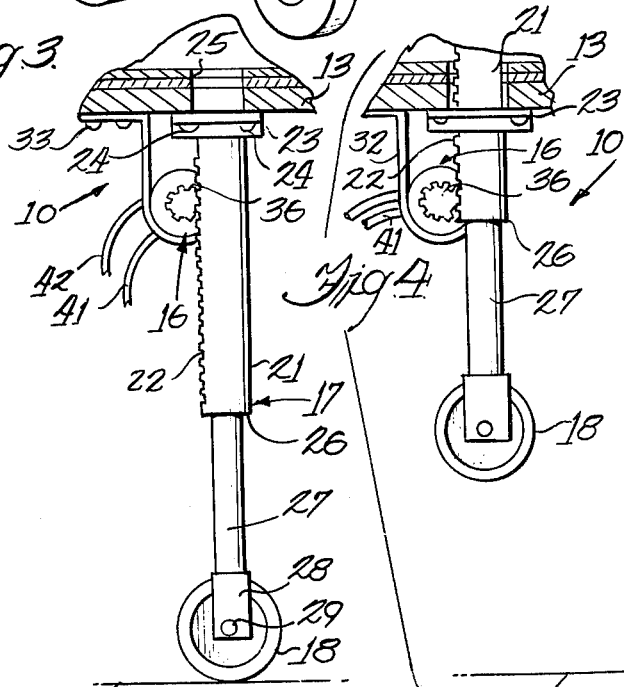
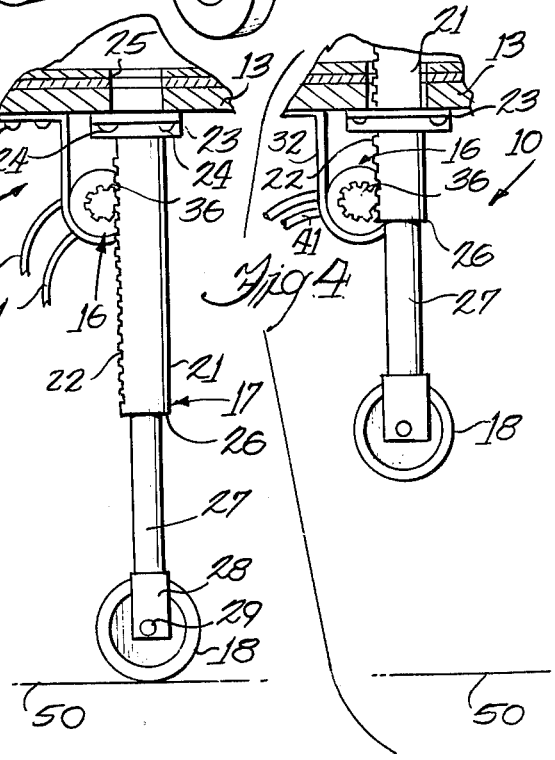
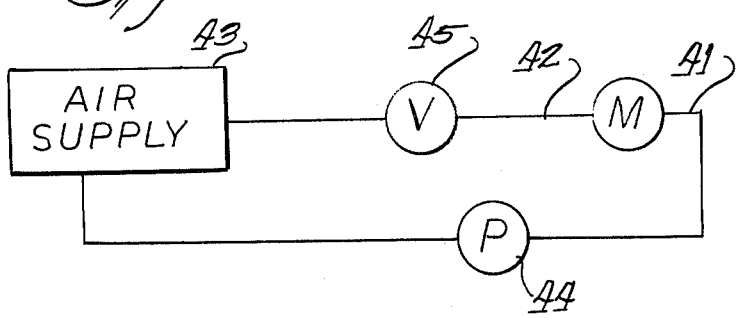

MOTOR DRIVEN DOLLY ACTUATOR FOR SEMI-TRAILERS AND SIMILAR VEHICLES

BACKGROUND OF THE INVENTION

1. Field of the Invention

This invention relates generally to dollies used on tractor-semi-trailer combinations wherein the rear end of a tractor is adapted to be backed under the forward end of a semi-trailer and automatically coupled thereto for combined service therewith, and more particularly to a novel and improved dolly controlled by an air driven motor to assume an inactive position during combined tractor-trailer service and to assume an active position supporting the front end of the trailer so that the tractor may be separated therefrom.

2. Description of the Prior Art

In the transportation industry it is a common practice to employ a number of trailers to be moved by different trucks or tractors, the trucks or tractors equipped to be attached to the underneath front portion of the trailers so as to move the trailers from location to location. Further, such provide a more efficient use of such trucks or tractors as a single truck or tractor can readily move several trailers from location to location where they are to be loaded or unloaded without waiting for the load to be handled, and a loaded or unloaded trailer may be temporarily stored or loaded over an extended period of time without having to tie up the more costly truck.

It is thus desirable that the truck or tractor be efficiently coupled and uncoupled from the trailer unit in an efficient and rapid manner. However, one of the problems often associated with hooking and unhooking of tractors to trailers is that of raising and lowering the dolly connected to the forward end of the trailer and which must be raised when the tractor is in the towing position and which must be lowered to support the front end of the trailer when the tractor is disconnected therefrom. Presently, these trailers are fitted with a hand crank with the vehicle operator having to leave the trailer and provide the mechanical work force required to rotate the crank to move the dolly wheel up or down. This is a slow procedure due to the gearing mechanism involved such that it normally takes between five to ten minutes to achieve the raising or lowering of the dolly wheel.

Further, the raising and lowering of the wheel is not only a tedious operation due to the efforts required on the part of the vehicle driver, but it is an inconvenient job which has to, on numerous occasions, be performed under undesirable weather conditions, such as on wet or icy surfaces in trucking terminals or shipping locations. In such weather, while exerting the force necessary to move the dolly, the vehicle operator is quite likely to slip due to unsure footing with the possibility of serious physical injury to the vehicle operator.

It would thus be desirable to provide a means for raising and lowering the dolly in a fast and efficient manner and with complete safety to the vehicle operator.

SUMMARY OF THE INVENTION

The present invention recognizes the problem in the raising and lowering of a dolly on a trailer and provides a novel solution thereto overcoming the deficiencies and disadvantages of presently available manually operated dolly operational means by providing an auxiliary air operated motor controllable from inside the vehicle tractor and operable in a manner to selectively raise and lower the dolly wheel in a rapid and efficient manner.

It is a feature of the present invention to provide a powered air motor adapted for operative connection to dolly assemblies on trailers for automating the raising and lowering of the dolly wheel.

A further feature of the present invention provides an automated dolly wheel operable by the vehicle operator from a protected position within the vehicle tractor cab to protect the operator from the weather and permit operation of the dolly in a safe manner.

The provision of a motor driven dolly actuator for semi-trailers and similar vehicles, such as briefly outlined above, and possessing the stated advantages, constitutes the principal features of the present invention. The provision of a dolly actuator which is relatively simple in its construction and which therefore may be readily manufactured at a relatively low cost and by simple manufacturing methods; one which is rugged and durable and which therefore may be guaranteed by the manufacturer to withstand rough usage; one which may, in its entirety, be manufactured and installed as part of the original equipment of the trailer, or which may be added to the trailer later as an accessory item; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a tractor-trailer combination having a motor driven dolly actuator constructed in accordance with the present invention;

FIG. 2 is an enlarged fragmentary front elevational view of the motor driven dolly actuator with the dolly wheel in the extended position in contact with the ground;

FIG. 3 is a side elevational view of FIG. 2;

FIG. 4 is a side elevational view similar to FIG. 3 but illustrating the dolly wheel in the raised inoperative position; and FIG. 5 is a schematic diagram of the system powering the motor driven dolly actuator.

DESCRIPTION OF THE PREFERRED EMBODIMENT

Referring now to the drawings in detail there is illustrated a preferred form of a motor driven dolly actuator constructed in accordance with the present invention and designated generally by the reference numeral 10, and which is shown mounted to the front end portion of a trailer 11 having a tractor vehicle cab 12 attached thereto in the conventional manner for towing the tractor, the trailer having a bottom flooring 13 and a chassis side frame member 14.

The dolly actuator 10 includes an air driven motor 16 and a dolly assembly 17 having a dolly wheel 18 rotatably supported at the bottom end thereof.

The dolly assembly 17 includes an elongated cylindrical supporting column 21 having a longitudinal rack of teeth 22 formed integrally along one side thereof, the column being telescopically supported in a ring shaped collar member 23 suitably fastened by bolts 24 to the trailer flooring 13 about an opening 25 disposed in the trailer flooring and adapted to receive therethrough the top end portion of the supporting column. The bottom end 26 of the column has attached thereto an elongated cylindrical shaft 27 which terminates in an inverted U-shaped bracket 28 having a pivot pin 29 extending between the legs of the bracket and rotatably supporting therebetween the dolly wheel 18.

The air driven motor 16 includes an elongated cylindrical motor housing 31 secured by a U-shaped bracket 32 to the floor board 13 of the trailer by suitable fasteners 33, the motor disposed adjacent the rack 22 and having a shaft 34 extending axially out of the front end 35 of the motor and formed with a gear 36 thereon having teeth in meshing engagement with the rack 22 such that rotation of the gear 36 in one direction about its axis will effect the raising of the dolly wheel 18 while rotation of the gear about its axis in the opposite direction will effect the lowering of the dolly wheel. The air powered motor 16 is connected by suitable tubing 41 and 42 to an air supply 43 and a pump 44 by means of a control valve 45 such that operation of the control valve in one direction will effect rotation of the motor in one direction whereas operation of the control valve in the opposite direction will effect the reverse operation of the motor so as to effect the extending or retraction of the dolly wheel 18.

The extended operable position of the dolly in seen in FIG. 3 where the dolly wheel 18 is in engagement with the ground supporting surface 50, with the retracted inoperative position of the dolly wheel illustrated in FIG. 4 where the dolly wheel is separated from the ground permitting the towing of the trailer 11 by the tractor 12 unhindered by the dolly wheel.

It is to be understood that the pump 44 and air supply 43 are those which are normally supplied on tractor-trailers which utilize air systems for their brakes and other controls, and it is this same pressurized air system which is utilized to run the air operated motor 16. Further, it is to be understood that the present invention may be readily incorporated on dollies presently utilizing hand operated cranks with it being possible to retain the hand crank on the dolly for emergency use while still effecting the normal operation of the dolly automatically by the air driven motor. Further, it is understood that the valve 45 is preferably disposed within the cab of the tractor 12 so that the tractor operator may effect the operation of the dolly without having to leave the tractor cab.

It is to be understood that the form of this invention herewith shown and described is to be taken as a preferred example of the same, and that this invention is not to be limited to the exact arrangement of parts shown in the accompanying drawings or described in this specification, as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A dolly assembly intended for use with a tractor-trailer type vehicle wherein the dolly assembly is provided for supporting the front end of the trailer when separated from the tractor, the dolly assembly comprising, in combination:

a ring shaped collar member mounted to the bottom surface of the trailer concentric with an opening provided through the trailer bottom surface which is of a diameter not less than the diameter of the opening in the ring shaped collar member;

an elongated vertically disposed cylindrically shaped supporting column having a top end, a bottom end, and vertically extending cylindrical side wall surfaces;

an elongated solid cylindrically shaped rod disposed concentric with said supporting column and having a top end, a bottom end, and cylindrical side wall surfaces;

said top end of said rod being affixed to said bottom end of said supporting column concentric therewith, said rod projecting vertically downwardly therefrom;

an inverted U-shaped bracket having a bight portion and opposed parallel leg portions, the bight portion being affixed to said bottom end of said rod and projecting diametrically outwardly of opposite diametric portions of said rod with said leg portion extending parallel to the longitudinal axis of said rod and downward from said bottom end thereof;

a pin member extending laterally between the opposite ends of said leg members and affixed thereto;

a dolly wheel of a width less than the distance between said leg members and of a diameter less than the distance from said pin member to said bight portion being provided, said dolly wheel having a bore extending through the axis thereof of a diameter greater then said pin with said dolly wheel being rotatively mounted on said pin for rotation thereabout, the dolly wheel being straddled within said leg members;

said top end of said support column being received in said collar member opening with said support column mounted for reciprocal vertical movement relative to said collar member for movement between a retracted position inwardly of said collar member and projecting into said trailer to raise the dolly wheel out of contact with the ground a sufficient distance to prevent any interference of the dolly wheel with the towing of the trailer when attached to the tractor, and to an operable extended position outwardly of said collar member where the dolly wheel is disposed in contact with the ground for supporting the front end of the trailer when separated from the tractor;

a rack of continuous teeth formed integrally along a a longitudinal segment of said support column side walls intermediate said top and said bottom ends thereof;

said rack disposed in the plane defined by said dolly wheel and said axis of said support column;

a U-shaped bracket affixed to the trailer bottom surface in a position adjacent said support column and extending in a plane parallel to said plane defined by said rack of teeth, dolly wheel and support column;

an air operated power driven motor mounted in said U-shaped bracket with its longitudinal axis extending normal to the plane of said bracket;

a shaft extending axially outwardly of said motor to a position adjacent said rack of teeth;

a cylindrically shaped gear wheel having longitudinally extending teeth defined completely about the circumference of the side walls thereof mounted concentric on the outermost end of said motor shaft with said teeth engaging the teeth of said rack;

a source of air supply;

a pump to maintain said source of air supply;

suitable flexible tubing interconnecting said air operated motor to said source of air supply and said pump for energizing said motor;

valve means connected in series relationship with said tubing intermediate said motor and said air supply and operable to direct air supply in a first direction for effecting the operation of said motor in a first direction to retract said column and raise said dolly wheel out of contact with the ground, and operable in a second position to energize said motor in a second direction to lower said column and effect engagement of said dolly wheel with the ground to support the trailer thereon;

said valve means being disposed in the tractor cab to effect operation of the motor and the dolly assembly from the vehicle operator's position in the tractor cab without the operator having to leave the cab.

* * * * *